(12) United States Patent
Namuduri et al.

(10) Patent No.: US 8,253,281 B2
(45) Date of Patent: Aug. 28, 2012

(54) ENERGY HARVESTING APPARATUS INCORPORATED INTO SHOCK ABSORBER

(75) Inventors: Chandra S. Namuduri, Troy, MI (US); Yunjun Li, West Bloomfield, MI (US); Timothy J. Talty, Beverly Hills, MI (US); Robert B. Elliott, Waterford, MI (US); Nancy McMahon, Rochester Hill, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 452 days.

(21) Appl. No.: 12/394,328

(22) Filed: Feb. 27, 2009

(65) Prior Publication Data

US 2010/0219798 A1   Sep. 2, 2010

(51) Int. Cl.
*H02K 33/00* (2006.01)
*H02K 35/00* (2006.01)
(52) U.S. Cl. ............... 310/23; 310/15; 310/30; 310/34; 310/36; 310/12.14
(58) Field of Classification Search ............... 310/12.12, 310/14, 15, 23, 30, 34, 36; *H02K 33/00, H02K 35/00*
See application file for complete search history.

(56) References Cited

U.S. PATENT DOCUMENTS

| | | | |
|---|---|---|---|
| 2,594,755 A * | 4/1952 | Felt | 431/131 |
| 3,770,290 A * | 11/1973 | Bottalico | 280/124.165 |
| 3,984,707 A * | 10/1976 | McClintock | 310/15 |
| 4,297,609 A | 10/1981 | Hirao et al. | |
| 4,458,234 A | 7/1984 | Brisard | |
| 4,600,215 A | 7/1986 | Kuroki et al. | |
| 4,757,315 A | 7/1988 | Lichtenberg et al. | |
| 4,817,922 A | 4/1989 | Hovance | |
| 4,822,063 A | 4/1989 | Yopp et al. | |
| 4,827,416 A | 5/1989 | Kawagoe et al. | |
| 4,836,578 A | 6/1989 | Soltis | |
| 5,009,450 A | 4/1991 | Herberg et al. | |
| 5,056,913 A | 10/1991 | Tanaka et al. | |
| 5,103,396 A | 4/1992 | Hiwatashi et al. | |
| 5,127,667 A | 7/1992 | Okuda et al. | |
| 5,218,308 A | 6/1993 | Posebeck et al. | |

(Continued)

FOREIGN PATENT DOCUMENTS

DE    39 09 190 C1    8/1990

(Continued)

OTHER PUBLICATIONS

Namuduri, Chandra S. et al. "Notice of Allowance" mailed Jan. 4, 2011; U.S. Appl. No. 12/394,438, filed Feb. 27, 2009.

(Continued)

*Primary Examiner* — Quyen Leung
*Assistant Examiner* — Terrance Kenerly
(74) *Attorney, Agent, or Firm* — Ingrassia Fisher & Lorenz P.C.

(57) ABSTRACT

An energy harvesting apparatus, for deployment on a vehicle, comprises a vehicle shock absorber including a dust tube, and a damper tube telescopically mounted within the dust tube and configured for oscillating translational movement with respect thereto. A magnet is fixedly coupled to one of the dust tube or the damper tube, and a coil is fixedly coupled to the other of the dust tube or the damper tube to achieve relative translational movement between the magnet and the coil to induce a current in the coil.

9 Claims, 4 Drawing Sheets

U.S. PATENT DOCUMENTS

| | | | |
|---|---|---|---|
| 5,251,729 A | 10/1993 | Nehl et al. | |
| 5,267,466 A | 12/1993 | Morris | |
| 5,347,186 A * | 9/1994 | Konotchick | 310/17 |
| 5,373,445 A | 12/1994 | Yopp | |
| 5,390,949 A | 2/1995 | Naganathan et al. | |
| 5,450,322 A | 9/1995 | Tanaka et al. | |
| 5,461,564 A | 10/1995 | Collins et al. | |
| 5,638,927 A | 6/1997 | Cheatham et al. | |
| 5,944,763 A | 8/1999 | Iwasaki | |
| 5,973,422 A * | 10/1999 | Clamme | 310/36 |
| 5,990,441 A | 11/1999 | Zaenglein et al. | |
| 6,069,581 A | 5/2000 | Bell et al. | |
| 6,111,375 A * | 8/2000 | Zenobi | 318/376 |
| 6,209,691 B1 | 4/2001 | Fehring et al. | |
| 6,234,654 B1 | 5/2001 | Okuchi et al. | |
| 6,328,144 B1 | 12/2001 | Hayakawa et al. | |
| 6,427,812 B2 | 8/2002 | Crawley et al. | |
| 6,502,837 B1 | 1/2003 | Hamilton et al. | |
| 6,614,239 B2 | 9/2003 | Borghi | |
| 6,694,856 B1 | 2/2004 | Chen et al. | |
| 6,771,007 B2 | 8/2004 | Tanielian | |
| 6,866,127 B2 | 3/2005 | Nehl et al. | |
| 6,938,311 B2 | 9/2005 | Tanielian | |
| 7,057,330 B2 | 6/2006 | Buhler et al. | |
| 7,123,351 B1 | 10/2006 | Schaefer | |
| 7,221,437 B1 | 5/2007 | Schaefer | |
| 7,250,697 B2 * | 7/2007 | Beaulieu | 310/12.12 |
| 7,261,171 B2 | 8/2007 | De La Torre et al. | |
| 7,380,800 B2 | 6/2008 | Klees | |
| 7,420,462 B2 | 9/2008 | Nordmeyer | |
| 7,521,841 B2 | 4/2009 | Clingman et al. | |
| 7,654,370 B2 | 2/2010 | Cubalchini, Jr. | |
| 7,733,239 B2 | 6/2010 | Nordmeyer | |
| 7,737,608 B2 | 6/2010 | Ruggeri et al. | |
| 7,770,701 B1 | 8/2010 | Davis | |
| 7,777,396 B2 | 8/2010 | Rastegar et al. | |
| 7,839,058 B1 | 11/2010 | Churchill et al. | |
| 7,849,983 B2 | 12/2010 | St. Clair et al. | |
| 7,938,410 B2 * | 5/2011 | Buma et al. | 280/5.508 |
| 7,948,613 B2 | 5/2011 | Fourcault et al. | |
| 2002/0032508 A1 | 3/2002 | Uchino et al. | |
| 2003/0034697 A1* | 2/2003 | Goldner et al. | 310/17 |
| 2005/0077692 A1 | 4/2005 | Ogawa | |
| 2005/0090956 A1 | 4/2005 | Ogawa | |
| 2005/0270221 A1 | 12/2005 | Fedotov et al. | |
| 2006/0176158 A1 | 8/2006 | Fleming | |
| 2006/0186586 A1 | 8/2006 | Soles et al. | |
| 2006/0188120 A1* | 8/2006 | Fisher | 381/338 |
| 2006/0220330 A1* | 10/2006 | Urquidi et al. | 280/5.516 |
| 2006/0271678 A1 | 11/2006 | Jessup et al. | |
| 2007/0032913 A1 | 2/2007 | Ghoneim et al. | |
| 2007/0129865 A1 | 6/2007 | Kim | |
| 2007/0205881 A1 | 9/2007 | Breed | |
| 2007/0236098 A1* | 10/2007 | Kusase et al. | 310/263 |
| 2007/0247011 A1* | 10/2007 | Shichijoh et al. | 310/112 |
| 2007/0251776 A1 | 11/2007 | Braun | |
| 2008/0116849 A1 | 5/2008 | Johnston | |
| 2008/0238268 A1* | 10/2008 | Hamada | 310/68 C |
| 2008/0252174 A1 | 10/2008 | Mohammadi et al. | |
| 2008/0277939 A1 | 11/2008 | Richardson et al. | |
| 2008/0284258 A1 | 11/2008 | Spratte et al. | |
| 2009/0021720 A1 | 1/2009 | Hecker | |
| 2009/0045698 A1 | 2/2009 | Genis et al. | |
| 2009/0278927 A1 | 11/2009 | Ishiyama et al. | |
| 2010/0045143 A1 | 2/2010 | Martin | |
| 2010/0052475 A1 | 3/2010 | Lee | |
| 2010/0084947 A1 | 4/2010 | Yoon et al. | |
| 2010/0094503 A1 | 4/2010 | Li et al. | |
| 2010/0123568 A1 | 5/2010 | Namuduri et al. | |
| 2010/0125389 A1 | 5/2010 | Talty et al. | |
| 2010/0219641 A1 | 9/2010 | Namuduri et al. | |
| 2010/0219720 A1 | 9/2010 | Namuduri et al. | |
| 2010/0219721 A1 | 9/2010 | Namuduri et al. | |
| 2010/0225527 A1 | 9/2010 | Talty et al. | |
| 2010/0244629 A1 | 9/2010 | Nagashima et al. | |

FOREIGN PATENT DOCUMENTS

| | | |
|---|---|---|
| DE | 41 12 276 C2 | 11/1992 |
| DE | 295 18 322 U1 | 1/1996 |
| DE | 103 58 764 A1 | 7/2005 |
| DE | 10 2004 010 229 A1 | 9/2005 |
| DE | 10 2005 008 403 A1 | 9/2006 |
| FR | 2594755 A3 | 8/1987 |
| GB | 2 098 007 A | 11/1982 |
| JP | 60101425 A | 6/1985 |
| JP | 4359901 B1 | 11/2009 |

OTHER PUBLICATIONS

Chinese Office Action for Chinese Application No. 200910206391.1 mailed Jan. 19, 2011.

U.S. Office Action for U.S. Appl. No. 12/271,551 mailed Feb. 10, 2011.

German Office Action for German Application No. 10 2009 047 855.8-21 mailed Jan. 21, 2011.

German Office Action for German Application No. 10 2009 052 717.6-21 mailed Feb. 16, 2011.

Notice of Allowance mailed Nov. 18, 2010, issued in U.S. Appl. No. 12/394,438.

Notice of Allowance mailed Oct. 8, 2010, issued in U.S. Appl. No. 12/400,112.

Sang-Dong, K., et al., "Performance Analysis of UWB Radar for Vehicle in Multi-User Environments," 10th International Conference on Advanced Communication Technology, ICACT. Feb. 17-20, 2008, pp. 1036-1039, vol. 2.

Samkov, S.V., "Signal Processing in UWB Radars of Small Distance," 2004 Second International Workshop on Ultrawideband and Ultrashort Impulse Signals. Sep. 19-22, 2004, pp. 208-210.

Optek Technology, Inc. "OPTEK's Autopad Contactless Sensor Delivers Absolute Position, Angle and Linear Displacement Sensing." [Retrieved on Aug. 11, 2008]. Retrieved from Internet: <URL: http://license.icopyright.net/user/viewFreeUse.act?fuid=MTM4Mjg4MQ%3D%3D>.

Li, Y., et al. "Self-Powered Vehicle Sensor Systems," U.S. Appl. No. 12/900,707.

German Office Action for German Application No. 10 2010 008 318.6 mailed May 11, 2011.

U.S. Office Action dated Jul. 6, 2011 for U.S. Appl. No. 12/252,114.

U.S. Notice of Allowance dated Jul. 18, 2011 for U.S. Appl. No. 12/394,322.

U.S. Office Action dated Jun. 17, 2011 for U.S. Appl. No. 12/394,326.

U.S. Office Action dated Aug. 1, 2011 for U.S. Appl. No. 12/272,074.

U.S. Final Office Action dated Jul. 15, 2011 for U.S. Appl. No. 12/271,551.

Notice of Allowance, dated Jan. 9, 2012, for U.S. Appl. No. 12/272,074.

Notice of Allowance, dated Jan. 5, 2012, for U.S. Appl. No. 12/271,551.

Notice of Allowance, dated Nov. 16, 2011, for U.S. Appl. No. 12/394,326.

Notice of Allowance, dated Dec. 12, 2011, for U.S. Appl. No. 12/252,114.

* cited by examiner

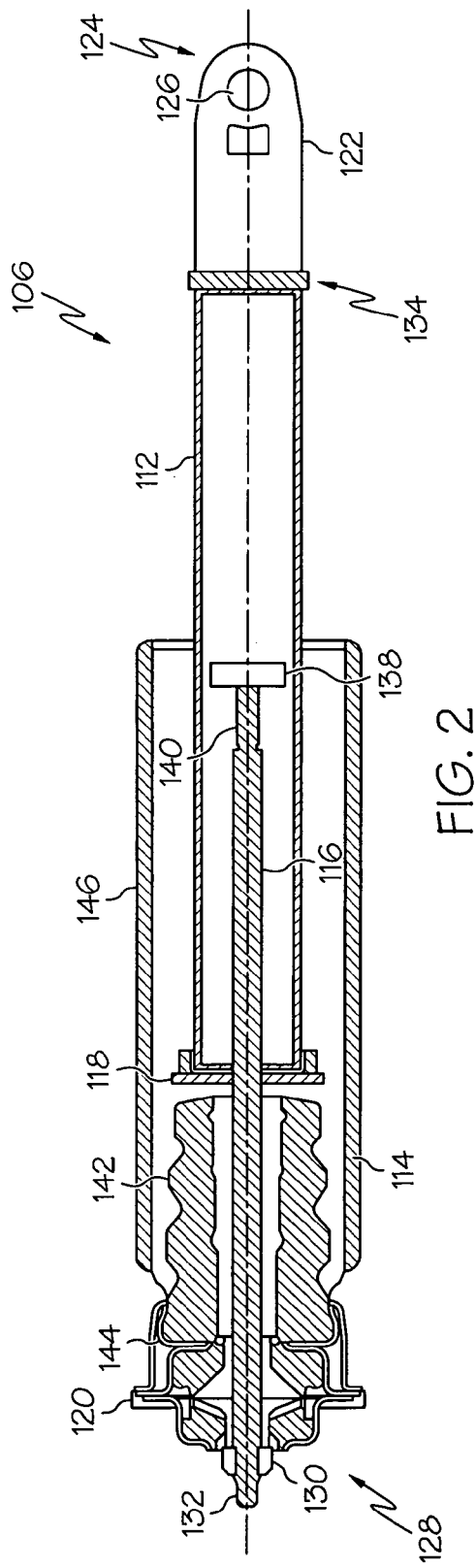
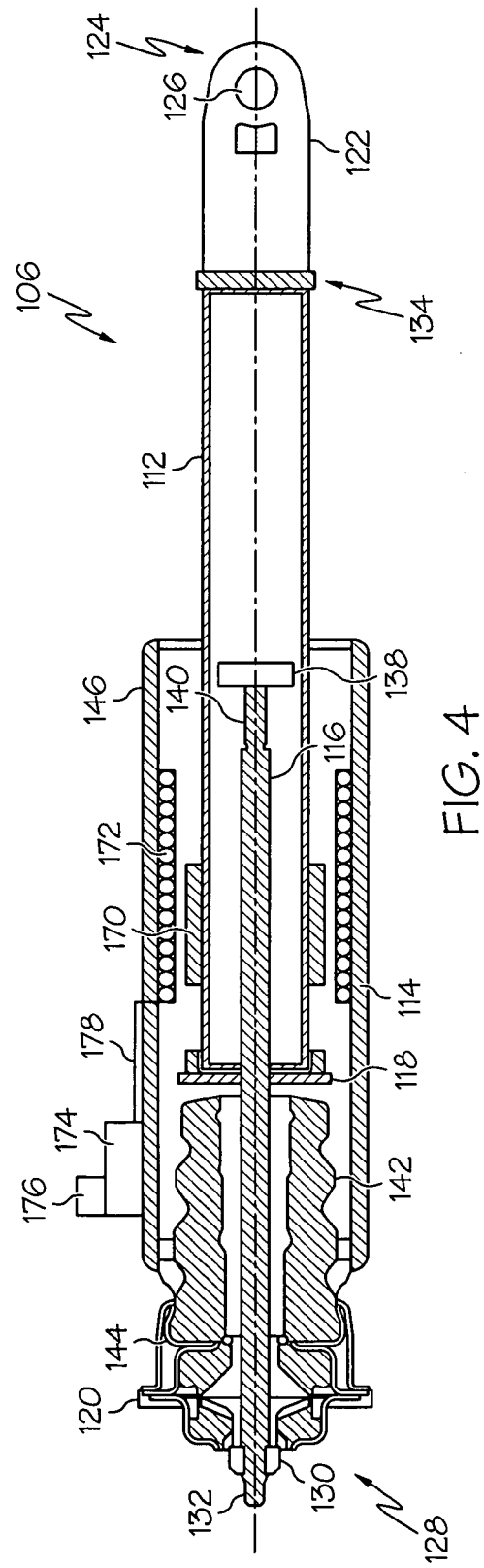

ENERGY HARVESTING APPARATUS INCORPORATED INTO SHOCK ABSORBER

TECHNICAL FIELD

This relates generally to a system for generating power and, more particularly, to a system for harvesting energy from vehicular vibrations.

BACKGROUND OF THE INVENTION

Increasing demands for better fuel economy have lead to improvements and developments in hybrid vehicles, electric vehicles, and vehicles powered by fuel cells or diesel fuel. Efforts on the part of the automotive industry to increase fuel economy have included, but are not limited to, reductions in mass, improved aerodynamics, active fuel management, direct injection engines, homogeneous charge compression ignition engines, and hybrid engines. Still, other mechanisms, techniques, and energy sources that will improve fuel economy are continually being sought.

It is generally known that vehicles are subjected to vibrations, especially while being driven. These vibrations have typically been considered undesirable. In fact, a great deal of effort has gone into the development of suspension systems that include springs, shock absorbers, and the like, that provide vehicular stability and insulate the vehicle's passenger compartment from vibration caused by, for example, driving on bumpy or otherwise tortuous roadways. Currently, the energy associated with these vibrations is lost. However, harvesting and utilizing this energy would provide an additional source of energy that could be used to increase fuel economy. The ability to tap this additional source of energy while not compromising the benefits of modern vehicular suspension systems would greatly benefit both the automotive industry and their customers.

Accordingly, it is desirable to provide an apparatus for harvesting the energy associated with vehicle vibrations to produce useable power. Furthermore, other desirable benefits, features, and characteristics will become apparent from the subsequent summary, detailed description, and the appended claims, taken in conjunction with the accompanying drawings and this background.

SUMMARY

In accordance with an embodiment, an apparatus is provided for harvesting energy from vehicular vibrations. The apparatus comprises, among other things, a vehicle shock absorber comprising a dust tube, and a damper tube telescopically mounted within the dust tube and configured for oscillating translational movement with respect thereto. A magnet is fixedly coupled to one of the dust tube or the damper tube, and a coil is fixedly coupled to the other of the dust tube or the damper tube. This provides for relative translational movement between the magnet and the coil inducing a current in the coil.

DESCRIPTION OF THE DRAWINGS

The embodiments will hereinafter be described in conjunction with the following drawing figures, wherein like numerals denote like elements.

FIG. 2 is a cross-sectional view of a shock absorber suitable for use in conjunction with the suspension system shown in FIG. 1;

FIG. 4 is a cross-sectional view of an energy harvesting system in accordance with a second embodiment;

DESCRIPTION OF AN EXEMPLARY EMBODIMENT

The following detailed description is merely illustrative in nature and is not intended to limit the invention or the application and uses of the invention. Furthermore, there is no intention to be bound by any expressed or implied theory presented in the preceding technical field, background, brief summary or the following detailed description. The invention may be described herein in terms of functional and/or logical block components and various processing steps. It should be appreciated that such block components may be realized by any number of hardware, software, and/or firmware components configured to perform the specified functions. For the purposes of conciseness, conventional techniques and systems related to semiconductor processing, transistor theory, packaging, and power modules are not described in detail herein.

The following description refers to elements or nodes or features being "connected" or "coupled" together. As used herein, unless expressly stated otherwise, "connected" means that one element/node/feature is directly joined to (or directly communicates with) another element, node or other feature in mechanical, logical, electrical or other appropriate sense. Likewise, unless expressly stated otherwise, "coupled" means that one element/node/feature is directly or indirectly joined to (or directly or indirectly communicates with) another element/node/feature in a mechanical, logical, electrical or other appropriate sense. The term "exemplary" is used in the sense of "example," rather than "model." Further, although the figures may depict example arrangements of elements, additional intervening elements, devices, features, or components may be present in a practical embodiment of the invention.

Figure 1:
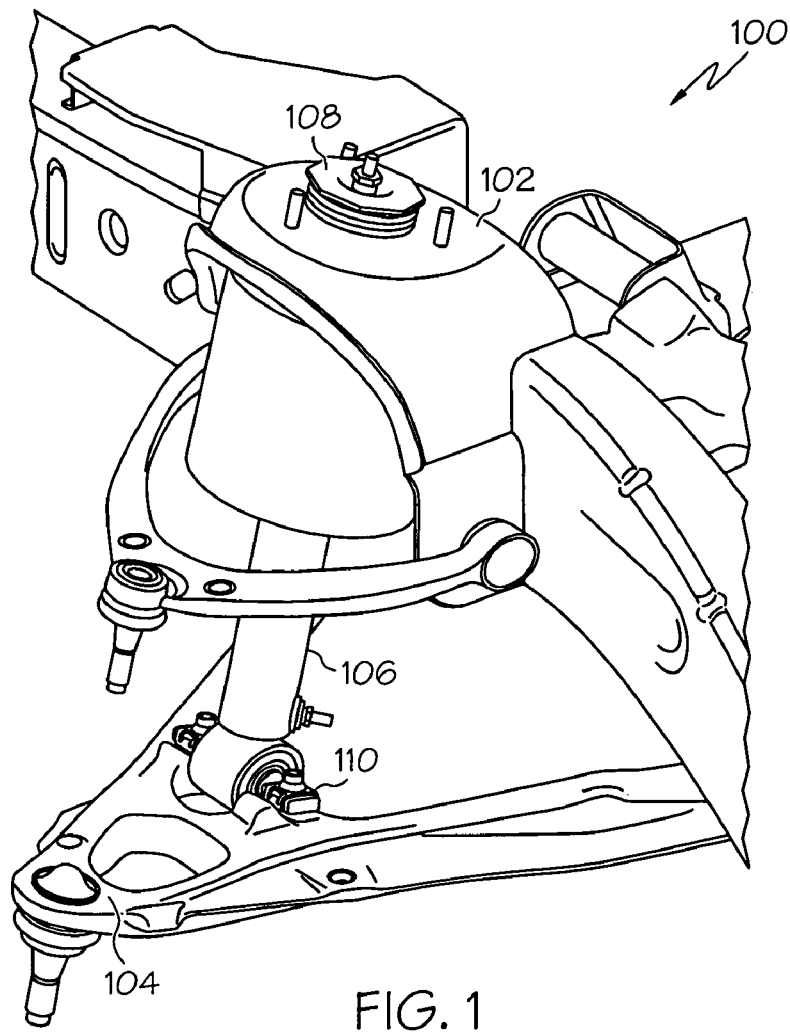
FIG. 1 is an isometric view of a portion of a traditional vehicular suspension system.

FIG. 1 illustrates a typical vehicular suspension system 100 that comprises a sprung mass such as frame member 102, an unsprung mass such as control arm 104, and a shock absorber 106 coupled between frame member 103 and control arm 104. Shock absorber 106 may be coupled to frame member 102 and control arm 104 by any suitable means including mounting brackets and fasteners such as is shown at 108 and 110 respectively. Upper and/or lower mounts 108 and 110 may include a bushing to provide for limited lateral motion between the vehicle's sprung and unsprung mass. During vehicle motion, shock absorber 106 provides a flexible and damped response to substantially vertical motion between the sprung and unsprung masses so as to limit and stabilize such motions thus providing a more comfortable ride to the passengers.

FIG. 2 is a cross-sectional view of a typical shock absorber 106. It comprises a damper tube 112, an exterior cylindrical housing or dust tube 114, a piston rod 116, a piston 138 secured on piston rod 116 by nut 135, a jounce bumper stopper 118, an upper mount assembly 120, and a lower mounting bracket 122. Shock absorber 106 is coupled in a conventional manner to lower control arm 104 (FIG. 1) at a first end 124 utilizing opening 126 in bracket 122 that is configured to receive a suitable fastener. Shock absorber 106 is likewise conventionally connected at a second end to frame member 102 by means of a self-locking flange nut 130 that is screwed onto a threaded end 132 of piston rod 116. Damper tube 112 is connected to mounting bracket 122 (and thus is coupled to the unsprung vehicle mass) at a lower end 134 of damper tube 112, and is connected to jounce bumper stopper 118 at an upper end 136. Piston rod 116 is positioned within damper tube 112 and extends through jounce bumper stopper 118. An optional jounce bumper stopper 142 is comprised of, for example, hard rubber, is coupled to a jounce bumper bracket 144 and is disposed concentrically about piston rod 116. Dust tube 114 is coupled to upper mount assembly 120 (and thus to the sprung vehicle mass), and extends concentrically around damper tube 112. Thus, damper tube 112 and dust tube 146 are configured for telescopic movement with respect to each other. That is, damper tube 112 is free to move or vibrate into and out of dust tube 146 as the vehicle encounters perturbations such as bumps and the like in the roadway. Typically, piston 138 is provided with a plurality of channels 137 therethrough; e.g., low speed bleed holes, a compression port, and a rebound port. Piston 138 is sealed at the sidewall of damper tube 112 forcing all fluid to flow through the bleed holes and/or rebound port and compression port, and valves associated therewith (not shown) to provide the required damping force.

If the surface of the roadway is rough, damper tube 112 will undergo vibrational type movement into and out of dust tube 146, each time requiring fluid to flow past piston 138. That is, if damper tube 112 is being forced into dust tube 146 (a bump), fluid must flow from the region in front of piston 138 to the region behind piston 138. If damper tube 112 is being pulled out of dust tube 146 (a hole), fluid flows from the region behind piston 138 to the region in front of piston 138.

Figure 3:
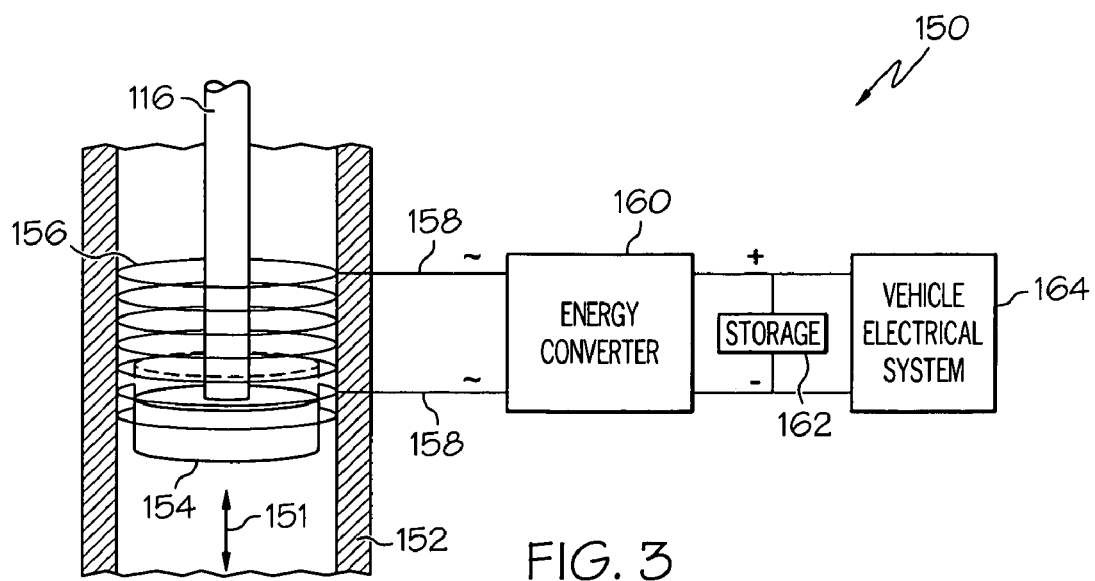
FIG. 3 is a cross-sectional view/block diagram of an exemplary energy harvesting system in accordance with a first embodiment.

As stated previously, damper tube 112 moves translationally with respect to piston 138 due to perturbations in the roadway. In FIG. 3, damper tube 112 is oriented vertically, and movement of damper tube 112 will be referred to as "up" or "down" with respect to piston 138.

FIG. 3 is a partial cross-section/partial block diagram of an energy harvesting mechanism shown generally at 150. A permanent magnet 154 is mounted in a shock absorber 152 (e.g. of the type shown in FIG. 2) and is configured for oscillating translational movement with respect to a coil 156 likewise mounted in or on shock absorber 152. The oscillating translational motion is indicated by arrow 151.

The oscillating movement of the permanent magnet 154 with respect to the coil 156 converts the mechanical energy provided by the translation of magnet 154 into electrical energy. This process, commonly referred to as electromechanical energy conversion, is based upon Faraday's law of electromagnetic induction that provides that if a coil, also referred to as a winding, is linked to a varying magnetic field (i.e., the coil 156 is linked to the permanent magnet 154), an electromagnetic force, or voltage, (emf) is induced across the coil. Therefore, the permanent magnet 154, provides the magnetic field set. Emf induction occurs at coil 156, and the associated AC current is carried from the coil 156 by means of electrical conductors 158 and applied to inputs to energy converter such as AC to DC converter 160.

Figure 7:
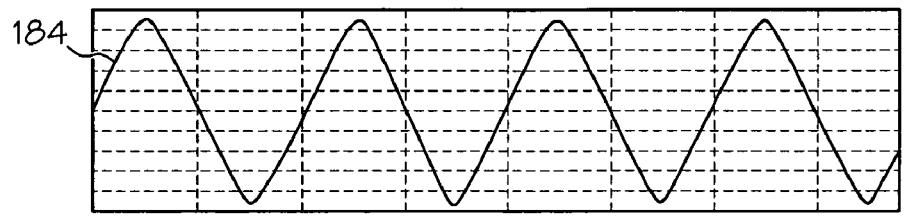
FIGS. 7, 8, and 9 are exemplary wave forms appearing at various points in the block diagram shown in FIG. 6.

AC to DC converter 160 receives the current produced on coil 156, which is a sinusoidal waveform in this example as is shown at 184 in FIG. 7. The energy is converted from AC to DC in converter 160, and the resultant DC energy may be stored in a storage device 162 (e.g. a battery, capacitor, etc.) coupled across the output terminals of AC to DC converter 160. This converted energy may then be made available to the vehicle's electrical system 164 as shown in FIG. 3. To summarize, magnetic coil 156 has an AC current induced therein by translating magnet 156. AC to DC converter 160 converts the AC energy to DC energy that charges an energy storage device 162 (e.g. a rechargeable battery or super capacitor), that may be used to power the vehicle's electrical system 164 including processors, sensors, actuators, etc.

FIG. 4 is a cross-sectional view of an energy harvesting apparatus in accordance with a further embodiment and embodying the principles described above in connection with FIG. 3. Referring to FIG. 4, there is shown a shock absorber 106 similar in construction and operation to that shown in FIG. 2 with the exception of the addition of a magnet 170 (e.g. a permanent magnet) fixedly couple to a surface of damper tube 112, a coil 172 fixedly coupled to a surface of dust tube 146 and, optionally, a rectifier 174 and connector 176 coupled to coil 172 via conductors 178 (only one of which is shown for clarity). As damper tube 112 oscillates within dust tube 146 as a result of the vehicle engaging bumps, pot-holes, and the like, magnet 170 vibrates back and forth within or in close proximity to coil 172 thus inducing an AC current in coil 172 as previously described in connection with FIG. 3. If desired, this current may be applied to a rectifier 174 via conductors 178. The rectified or DC current may then be made available to a storage device (e.g. 162 in FIG. 3) and/or made available to the vehicle's electrical system.

Figure 5:
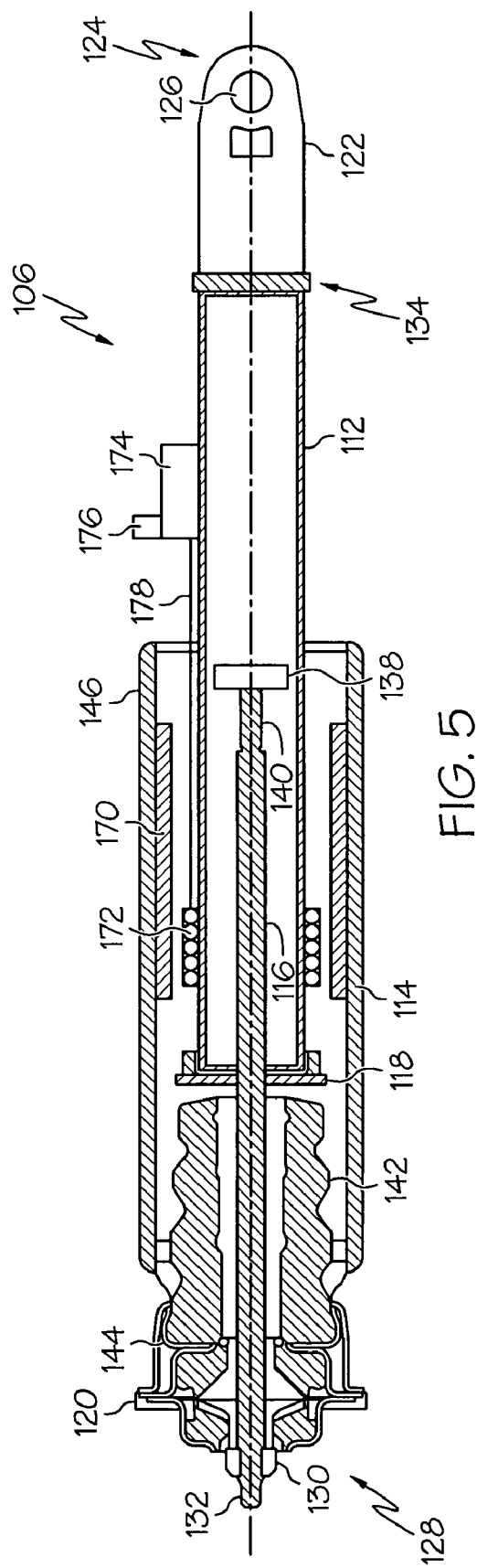
FIG. 5 is a cross-sectional view of an energy harvesting system in accordance with a third embodiment.

FIG. 5 is a cross-sectional view of an energy harvesting apparatus in accordance with a still further embodiment. As can be seen, the relative positions of magnet 170 and coil 172 have been exchanged. That is, magnet 170 is now fixedly coupled to an inner surface of dust tube 146, and coil 172 is mounted on an outer surface of damper tube 112. To accommodate this reversal, rectifier 174 and connector 176 may now be coupled to the surface of damper tube 112 via conductor 178 as shown. The operation of the system shown in FIG. 5 is similar to that previously described in connection with FIGS. 3 and 4. In this case, however, coil 172 oscillates in the vicinity of magnet 170 to induce a current in coil 172.

Figure 6:
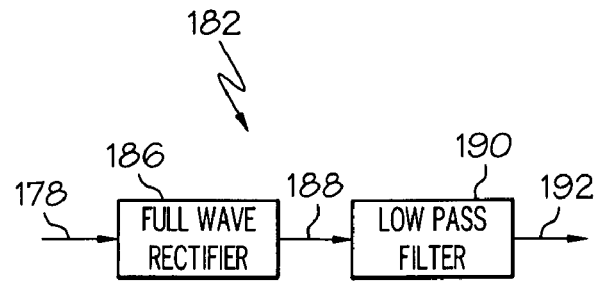
FIG. 6 is a block diagram of a rectifying and filtering circuit suitable for use in the energy harvesting system shown in FIGS. 3, 4, and 5.
Figure 8:
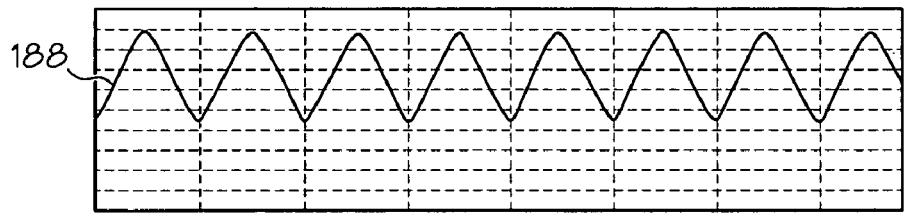
Figure 9:
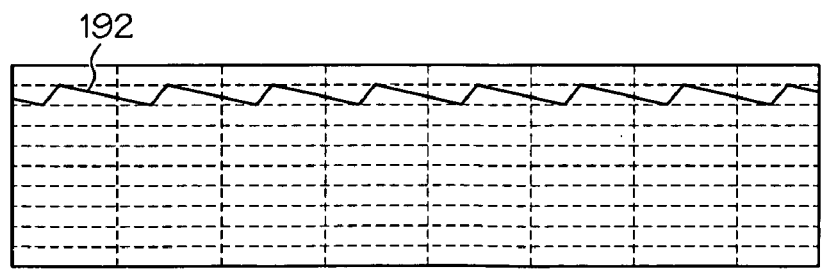

FIG. 6 is a block diagram of a rectifier circuit 182 suitable for use in conjunction with the embodiment shown in FIGS. 3, 4 and 5. FIGS. 7, 8, and 9 illustrate exemplary waveforms 184, 188, and 192 that appear at various places in the block diagram shown in FIG. 6 as will be more fully described below.

Referring to FIGS. 6-9, the AC signal (184 in FIG. 7) appearing at the outputs of coil 156 (FIG. 3) is applied to full wave rectifier 186. The rectified signal 188 (shown in FIG. 8) appearing at the output of rectifier 186 is applied to low pass filter 190 to produce waveform 192 (shown in FIG. 9).

Thus, there has been presented an apparatus that harvests energy created when a vehicle's suspension system is acted upon by perturbations (bumps, pot-holes, etc.) in a roadway. The translational movement of suspension system shock absorbers causes relative movement of a permanent magnet with respect to a coil inducing an AC current therein. The resultant induced AC current in the coil is then converted to a form suitable for energy storage and use by the vehicle's electrical system.

While at least one exemplary embodiment has been presented in the foregoing summary and detailed description, it should be appreciated that a vast number of variations exist. For example, the battery or capacitor could be packaged with the rectifier or packaged separately. The rectifier assembly could be mounted on the damper or on a separate structure, and the shock absorber may be passive or electronically controlled. In addition to being deployed on a shock absorber, the energy harvesting apparatus may be employed with a linear actuator used in active or semi-active control systems, lifting gate strut assemblies, and the like.

It should be appreciated that the exemplary embodiments are only examples, and are not intended to limit the scope, applicability, or configuration in any way. Rather, the foregoing summary and detailed description will provide those skilled in the art with a convenient road map for implementing an exemplary embodiment or embodiments of the invention, it being understood that various changes may be made in the function and arrangement of described elements without departing from the scope as set forth in the appended claims and their legal equivalents.

What is claimed is:

1. An energy harvesting apparatus, for deployment on a vehicle, the apparatus comprising:
   a vehicle shock absorber, comprising:
   a dust tube;
   a damper tube telescopically mounted within the dust tube and configured for oscillating translational movement within the dust tube;
   a magnet fixedly coupled to the dust tube;
   a coil fixedly coupled to the damper tube to achieve relative translational movement between the magnet and the coil inducing a current in the coil; and
   an energy converter coupled to the coil and mounted on the damper tube, the energy converter comprising a rectifier mounted on the damper tube.

2. An apparatus according claim 1 further comprising an energy storage device coupled to the energy converter.

3. An apparatus according to claim 2 wherein the energy storage device is a battery.

4. An apparatus according to claim 2 wherein the energy storage device is a capacitor.

5. An energy harvesting apparatus, for deployment on a vehicle, the apparatus comprising:
   a vehicle shock absorber, comprising:
   a dust tube, the dust tube configured as a cylinder with an inner surface and an opposite facing, outer surface;
   a damper tube telescopically mounted within the dust tube and configured for oscillating translational movement within the dust tube;
   a magnet fixedly coupled on the damper tube;
   a coil fixedly coupled on the inner surface of the dust tube to achieve relative translational movement between the magnet and the coil; and
   an energy converter coupled to the coil and mounted on the outer surface of the dust tube, the energy converter comprising a rectifier mounted on the outer surface of the dust tube.

6. An apparatus according to claim 5 wherein the magnet is fixedly coupled to an outer surface of the damper tube.

7. An apparatus according to claim 5 further comprising an energy storage device coupled to the energy converter.

8. An apparatus according to claim 7 wherein the energy storage device is a battery.

9. An apparatus according to claim 7 wherein the energy storage device is a capacitor.

* * * * *